United States Patent Office 3,009,969
Patented Nov. 21, 1961

3,009,969
SELECTIVE HYDROGENATION OF CONJUGATED DIOLEFINES TO MONOOLEFINES
Michael Staines Spencer and Dennis Albert Dowden, both of Norton-on-Tees, England, assignors to Imperial Chemical Industries Limited, London, England, a corporation of Great Britain
No Drawing. Filed Dec. 14, 1959, Ser. No. 859,145
Claims priority, application Great Britain Dec. 17, 1958
14 Claims. (Cl. 260—666)

This invention relates to the selective hydrogenation of olefines, for example the hydrogenation of butadiene to butenes.

In the hydrogenation of conjugated olefines, it is difficult to terminate the reaction at the production of the mono-olefines. Thus, in the hydrogenation of butadiene it is difficult to produce butenes without, at the same time, producing substantial quantities of n-butane.

The present invention provides a process in which butadiene and other conjugated olefines may be converted to the corresponding monoolefines without the production of substantial quantities of saturated hydrocarbons.

Thus, according to the present invention there is provided a process for the hydrogenation of conjugated olefines to mono-olefines without the formation of undesirable quantities of further hydrogenation products, which comprises the step of contacting a solution containing $[Co(CN)_5]^{3-}$ ions with a conjugated olefine in the presence of hydrogen.

It is believed the solution containing $[Co(CN)_5]^{3-}$ ions may contain these ions in equilibrium with $$[Co_2(CN)_{10}]^{6-}$$

ions according to the equation:

$$2[Co(CN)_5]^{3-} \rightleftharpoons [Co_2(CN)_{10}]^{6-}$$

that the $[Co_2(CN)_{10}]^{6-}$ ions may be reduced with the hydrogen employed to give $[HCo(CN)_5]^{3-}$ ions according to the equation:

$$H_2 + [Co_2(CN)_{10}]^{6-} \rightarrow 2[HCo(CN)_5]^{3-}$$

and that the hydrogenation-bearing $[HCo(CN)_5]^{3-}$ ions may then react with the conjugated olefine, for example, butadiene, according to the equation:

$$2[HCo(CN)_5]^{3-} + C_4H_6 \rightarrow 2[Co(CN)_5]^{3-} + C_4H_8$$

It will be observed that in this last reaction the $[Co(CN)_5]^{3-}$ ions are regenerated. It is to be understood that the present invention is not dependent upon the correctness of the theory of the reaction outlined above.

In carrying out the process of the present invention it is preferable to have a (CN)⁻:Co molar ratio of at least 5, otherwise there is a danger that cobaltous cyanide will be precipitated and this will lead to the oxidation of the cobalt complex.

The (CN)⁻:Co molar ratio has an influence on the product obtained. When the starting material is butadiene, the use of a (CN)⁻:Co molar ratio of the order of 5:1 gives rise to a product rich in trans-butene-2 whereas the use of a (CN)⁻:Co molar ratio of the order of 10:1 gives rise to a product rich in butene-1.

The process of the present invention may be operated over a fairly wide temperature range, for example 0° C. to 100° C., but is preferably operated in the vicinity of room temperature, for example 20° C. or below, and the reactants are not allowed to come into contact with air, otherwise undesirable oxidation takes place.

Elevated pressures, for example up to 100 atmospheres may be used.

The reaction may be carried out in aqueous solution or in the presence of an alcohol-water mixture, such as a methanol-water mixture or of a glycerol-water mixture.

When gaseous hydrocarbons, such as butadiene, are employed it is desirable to contact the solution containing $[Co(CN)_5]^{3-}$ ions with hydrogen to give hydrogen-bearing ions therein and then to pass the hydrocarbon in admixture with hydrogen through the solution containing the hydrogen-bearing ions. These steps may conveniently be carried out, for example, in a vertical column. It is desirable for the quantity of hydrogen in the gaseous mixture to be greater than that required stoichiometrically. It has been found that excess hydrogen may conveniently be provided by using two vertically disposed columns in series down which the solution is passed in counter-current flow to separate hydrogen supplies to each column, the hydrogen supply to the lower column being replaced by the mixture of the gaseous hydrocarbon and hydrogen after an initial purging period. It will be understood that the solution may be continuously recycled if desired. Alternatively, the solution containing hydrogen-bearing ions may be contacted with a gaseous olefine by shaking under a gas mixture of the hydrocarbon and hydrogen.

When using a liquid hydrocarbon such as cyclopentadiene, this may be added to the solution containing hydrogen-bearing ions and the mixture submitted to constant shaking under a hydrogen atmosphere. The liquid hydrocarbon may however be added to the solution containing $[Co(CN)_5]^{3-}$ ions and the mixture then subjected to a hydrogen atmosphere.

The invention is illustrated by the following examples.

*Example 1*

Two solutions were prepared, one containing 47.5 gm. of cobalt chloride, $CoCl_2 \cdot 6H_2O$ in 250 ml. water and the other containing 130 gm. of potassium cyanide in 250 ml. water. A glass column 70 cm. high and having an internal diameter of 4 cm. was packed with Raschig rings and the column was purged with hydrogen. Small volumes of the solutions were added alternately to the column until addition was complete and hydrogen was then bubbled through the liquid. A hydrogen-butadiene mixture was thereafter passed upwards through the column. Analyses of samples of the inlet and outlet gases were carried out by means of a mass spectrometer. The following results were obtained:

| | $H_2$ | $C_4H_6$ | $C_4H_8$ | $C_4H_{10}$ |
|---|---|---|---|---|
| Inlet gas_____percent__ | 60.6 | 39.2 | 0.1 | 0 |
| Outlet gas_____do____ | 65.6 | 25.4 | 9.0 | 0 |

*Example 2*

A catalyst solution, having a volume of 50 ml. and containing 2.6 gm. of potassium cyanide and 0.95 gm. of cobalt chloride, $CoCl_2 \cdot 6H_2O$, was contained in a 100 ml. flask. The (CN)⁻:Co molar ratio was 10:1. Hydrogen was introduced over the liquid, the pressure being 1 atm. absolute, and the flask was shaken. 31 ml. of gaseous hydrogen were absorbed. The hydrogen was then replaced by a hydrogen-butadiene mixture in which the hydrogen:butadiene volume ratio was 3:1. The liquid was again shaken and the gas uptake was 100 ml. A sample of the gas remaining above the liquid in the flask was analysed by gas chromatography and was found to have the following composition:

Butene-1 _____ 40.5% by volume.
Trans-butene-2 _____ 3.8% by volume.
Cis-butene-2 _____ 0.9% by volume.
Butadiene _____ Not detected.
n-Butane _____ Do.

Example 3

Example 2 was repeated, using, however, a catalyst solution containing 1.3 gm. of potassium cyanide and 0.95 gm. of cobalt chloride in 50 ml. of water. This catalyst had a (CN)⁻:Co molar ratio of 5:1. The reduction and reaction were carried out as before, the hydrogen absorption during the reduction step being 31 ml. and the gas uptake of the hydrogen-butadiene mixture during the reaction step being 174 ml. On analysis the residual gas was found to have the following composition:

| | |
|---|---|
| Butene-1 | 5.8% by volume. |
| Trans-butene-2 | 39.5% by volume. |
| Cis-butene-2 | 1.1% by volume. |
| Butadiene | Not detected. |
| n-Butane | Do. |

Example 4

Two solutions were prepared, one containing 15.2 gm. cobalt chloride, $CoCl_2.6H_2O$, in 200 ml. water and the other containing 41.6 gm. potassium cyanide in 200 ml. water. Two glass columns (each 50 cm. high and 4 cm. diameter, internal dimensions) were packed with Raschig rings, joined vertically and purged with hydrogen. The two solutions were mixed in the columns, the resulting catalyst solution, having a $(CN)^{-1}$:Co molar ratio of 10:1, was passed down the columns consecutively and recycled continuously at about 10 litres per hour by a pump. The hydrogen supply to the lower column was then replaced by a butadiene/hydrogen mixture at a flow rate of 5 litres per hour. Analyses of samples of the inlet gas to and the outlet gas from the lower column were carried out by gas chromatography or a mass spectrometer. The following results were obtained:

| | Inlet | Outlet |
|---|---|---|
| $H_2$ | 78.6 | 84.7 |
| butadiene | 21.0 | 8.0 |
| butene-1 | 0.3 | 7.2 |
| trans-butene-2 | 0 | 0.1 |
| cis-butene-2 | 0 | 0 |
| n-butane | 0 | 0 |

The exit gas from the upper column through which hydrogen alone was passed contained 4.5% butenes and 0.3% butadiene.

The temperature during the carrying out of the above four examples was about 20° C.

Example 5

Example 4 was repeated except that the catalyst solution contained 19.5 gm. cobalt chloride and 26.6 gm. potassium cyanide in 500 ml. water, giving a $(CN)^{-1}$:Co molar ratio of 5:1. A heating coil was inserted in the circulating system and the mean temperature of the columns was about 50° C. The following results were obtained.

| | Upper Column | | Lower Column | |
|---|---|---|---|---|
| | Inlet | Outlet | Inlet | Outlet |
| $H_2$ | 99.9 | 97.5 | 80.5 | 87.0 |
| butadiene | 0 | 0 | 19.4 | 9.2 |
| butene-1 | 0 | 0.4 | 0 | 0.5 |
| trans-butene-2 | 0 | 1.9 | 0 | 3.2 |
| cis-butene-2 | 0 | 0.2 | 0 | 0 |
| n-butane | 0 | 0 | 0 | 0 |

Example 6

Example 4 was repeated except that the catalyst solution contained 19.5 cobalt chloride and 53.2 gm. potassium cyanide in 500 ml. water, the solution was cooled and the mean temperature of the columns was 7° C. The following results were obtained:

| | Upper Column | | Lower Column | |
|---|---|---|---|---|
| | Inlet | Outlet | Inlet | Outlet |
| hydrogen | 100 | 96.7 | 81.1 | 84.3 |
| butadiene | 0 | 0 | 18.9 | 11.2 |
| butene-1 | | | 0 | 4.4 |
| trans-butene-2 | 0 | 2.6 | 0 | 0.1 |
| cis-butene-2 | | | 0 | 0 |
| n-butane | 0 | 0 | 0 | 0 |

Example 7

Example 4 was repeated except that the catalyst solution was heated to 60° C. The following results were obtained:

| | Upper Column | | Lower Column | |
|---|---|---|---|---|
| | Inlet | Outlet | Inlet | Outlet |
| hydrogen | 100 | 96.5 | 81.0 | 84.5 |
| butadiene | 0 | 0 | 18.9 | 13.4 |
| butene-1 | | | 0.1 | 1.2 |
| trans-butene-2 | 0 | 3.1 | 0 | 0.4 |
| cis-butene-2 | | | 0 | 0.1 |
| n-butane | 0 | 0 | 0 | 0 |

Example 8

52 gm. potassium cyanide were sealed into a glass tube and put, together with a solution of 19.0 gm. cobalt chloride in 500 ml. water and some steel balls (to break the tube), into an autoclave of 1100 ml. capacity. After three purges with hydrogen the autoclave was evacuated and 55 gm. butadiene expanded in from a weighed cylinder. It was then brought to 100° C. and hydrogen admitted, first to 50 atm. and then to 100 atm. total pressure. An uptake of 39 atm. was observed. When the pressure was released samples were taken of the exit gas and analysed by gas chromatography with the following results:

| | |
|---|---|
| Hydrogen | 18.5%. |
| Butadiene | 16.9%. |
| Butene-1 | 30.9%. |
| Trans-butene-2 | 19.6%. |
| Cis-butene-2 | 14.2%. |
| n-Butane | None detected. |

Example 9

A catalyst solution having a volume of 50 ml. and containing 1.3 gm. of potassium cyanide and 0.95 gm. of cobalt chloride, $CoCl_2.6H_2O$, was contained in a 100 ml. flask. The (CN)⁻:Co molar ratio was 5:1. To this solution 5 ml. of cyclopentadiene monomer were added and hydrogen, at a pressure of 1 atm. absolute, was introduced over the liquid mixture. The hydrogen was continuously absorbed and was stopped after an uptake of 470 ml. The temperature was 20° C.

Analysis of the gas above the liquid by means of a mass spectrometer showed hydrogen, cyclopentadiene and cyclopentene only.

We claim:

1. A process for the hydrogenation of conjugated di-olefines to mono-olefines without the formation of undesirable quantities of further hydrogenation products, which comprises the step of contacting a catalyst solution prepared by mixing an aqueous solution of a soluble salt of divalent cobalt with a solution of an alkali metal cyanide with a conjugated di-olefine in the presence of hydrogen.

2. A process as claimed in claim 1 when operated at a temperature in the range of 0° C. to 100° C.

3. A process as claimed in claim 2 in which the temperature is about 20° C.

4. A process as claimed in claim 1 when operated at a pressure in the range of 1 to 100 atmospheres.

5. A process as claimed in claim 1 when carried out in an aqueous solution.

6. A process as claimed in claim 1 when carried out in an alcohol-water mixture.

7. A process as claimed in claim 1 in which the catalyst solution is contacted with hydrogen to give hydrogen-bearing ions therein before being contacted with a conjugated di-olefine.

8. A process as claimed in claim 7 in which the di-olefine is gaseous and is passed, in admixture with hydrogen, through the solution containing hydrogen-bearing ions.

9. A process as claimed in claim 8 in which the quantity of hydrogen in the gaseous mixture is greater than that stoichiometrically required.

10. A process as claimed in claim 7 in which the solution containing hydrogen-bearing ions is contacted with a gaseous di-olefine by shaking under a gas mixture of the hydrocarbon and hydrogen.

11. A process as claimed in claim 7 in which the solution containing hydrogen-bearing ions is contacted with a liquid di-olefine by adding the di-olefine to the solution and submitting the mixture to a constant shaking under a hydrogen atmosphere.

12. A process as claimed in claim 1 in which the catalyst solution is contacted with a liquid di-olefine by adding the hydrocarbon to the solution and subjecting the mixture to a hydrogen atmosphere.

13. A continuous process for the hydrogenation of conjugated di-olefines to mono-olefines in the gaseous phase which comprises the steps of passing a solution prepared by mixing an aqueous solution of a soluble salt of di-valent cobalt with an aqueous solution of an alkali metal cyanide through two successive contact zones, contacting the solution counter-currently in the first zone with hydrogen and in the second zone with a gaseous mixture comprising hydrogen and the di-olefine to be hydrogenated, collecting gaseous mixtures comprising at least one mono-olefine from each contact zone, and collecting the solution from the second zone and returning it to the first zone.

14. A process as claimed in claim 1 in which the molar ratio of cyanide to cobalt in said catalyst solution is at least 5:1.

References Cited in the file of this patent

UNITED STATES PATENTS

| 2,207,071 | Reppe et al. | July 9, 1940 |
| 2,900,429 | Heinemann et al. | Aug. 18, 1959 |